United States Patent
Lee

(10) Patent No.: US 9,332,305 B1
(45) Date of Patent: May 3, 2016

(54) METHODS AND APPARATUS TO GENERATE THRESHOLD VALUES FOR STATE DETECTION

(71) Applicant: The Nielsen Company (US), LLC, Schaumburg, IL (US)

(72) Inventor: Morris Lee, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/595,969

(22) Filed: Jan. 13, 2015

(51) Int. Cl.
*H04H 60/32* (2008.01)
*H04N 21/439* (2011.01)
*H04N 21/442* (2011.01)
*H04N 21/466* (2011.01)
*H04N 21/422* (2011.01)
*H04N 21/41* (2011.01)
*H04N 21/45* (2011.01)

(52) U.S. Cl.
CPC ....... *H04N 21/4394* (2013.01); *H04N 21/4131* (2013.01); *H04N 21/42203* (2013.01); *H04N 21/44213* (2013.01); *H04N 21/4532* (2013.01); *H04N 21/4667* (2013.01)

(58) Field of Classification Search
CPC .................. H04N 21/4131; H04N 21/42203; H04N 21/4532
USPC .......................................... 725/9, 12, 14, 18
See application file for complete search history.

(56) References Cited

U.S. PATENT DOCUMENTS

| | | | |
|---|---|---|---|
| 3,733,430 A | 5/1973 | Thompson et al. | |
| 4,723,302 A | 2/1988 | Fulmer et al. | |
| 4,769,697 A | 9/1988 | Gilley et al. | |
| 6,286,140 B1 | 9/2001 | Ivanyi | |
| 7,277,859 B2 | 10/2007 | Watanabe et al. | |
| 7,647,605 B2 | 1/2010 | Lu et al. | |
| 7,760,248 B2 | 7/2010 | Marks et al. | |
| 7,882,514 B2 | 2/2011 | Nielsen et al. | |
| 8,526,626 B2 | 9/2013 | Nielsen et al. | |
| 8,948,895 B2 * | 2/2015 | Weiss ................ | G06F 17/30743 700/94 |

OTHER PUBLICATIONS

U.S. Appl. No. 14/313,414, "Methods and Apparatus to Characterize Households With Media Meter Data," filed Jun. 24, 2014, 116 pages.

* cited by examiner

*Primary Examiner* — Dominic D Saltarelli
(74) *Attorney, Agent, or Firm* — Hanley, Flight & Zimmerman, LLC

(57) ABSTRACT

Methods and apparatus to generate threshold values for state detection are disclosed. An example apparatus includes a collection of audio data elements each representative of a sound level present in an environment at a time of an ON-indication, an oldest one of the audio data elements to be replaced in response to detection of an ON-indication in the environment; and a selector to select, for a value of a threshold condition of a state detection analysis, one of the audio data elements corresponding to a quietest sound level.

22 Claims, 8 Drawing Sheets

METHODS AND APPARATUS TO GENERATE THRESHOLD VALUES FOR STATE DETECTION

FIELD OF THE DISCLOSURE

This disclosure relates generally to audience measurement and, more particularly, to methods and apparatus to generate threshold values for state detection.

BACKGROUND

Audience measurement of media (e.g., content and/or advertisements, such as broadcast television and/or radio programs and/or advertisements, streaming media, stored audio and/or video programs and/or advertisements played back from a memory such as a digital video recorder or a digital video disc, audio and/or video programs and/or advertisements played via the Internet, video games, etc.) often involves collection of media identifying data (e.g., signature(s), fingerprint(s), code(s), channel information, time of presentation information, etc.) and people data (e.g., user identifiers, demographic data associated with audience members, etc.). The media identifying data and the people data can be combined to generate, for example, media exposure data indicative of amount(s) and/or type(s) of people that were exposed to specific piece(s) of media.

DETAILED DESCRIPTION

Figure 1:
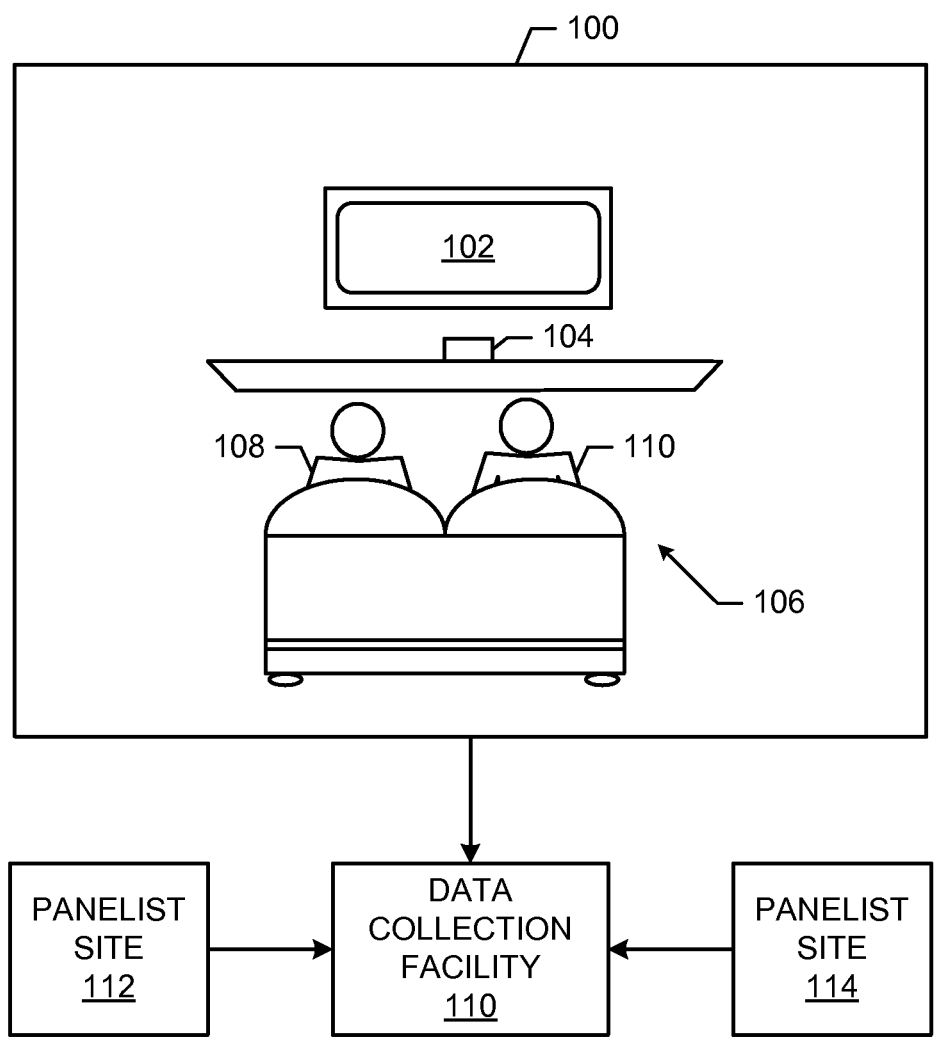
FIG. 1 is a block diagram of an example environment in which an example media monitoring system including an example meter constructed in accordance with teachings of this disclosure is deployed.

Audience measurement systems collect data associated with media exposure environments such as, for example, a television room, a family room, a living room, a bar, a restaurant, an office space, a cafeteria, etc. For example, an audience measurement system may collect media identifying information from media presentations being played in the media environment. Additionally or alternatively, the audience measurement system may collect people data by obtaining a series of images of the environment and analyzing the images to determine, for example, an identity of one or more persons present in the media exposure environment, an amount of people present in the media exposure environment during one or more times and/or periods of time, an amount of attention being paid to a media presentation by one or more persons, a gesture made by a person in the media exposure environment, etc.

In some examples, the people data is correlated with the media identifying information corresponding to detected media to provide exposure data for that media. For example, an audience measurement entity (e.g., The Nielsen Company (US), LLC) can calculate ratings for a first piece of media (e.g., a television program) by correlating data collected from a plurality of panelist sites with the demographics of the panelist. For example, in each panelist site wherein the first piece of media is detected in the monitored environment at a first time, media identifying information for the first piece of media is correlated with presence information detected in the environment at the first time. The results from multiple panelist sites are combined and/or analyzed to provide ratings representative of exposure of an audience (e.g., an entire population, a demographic segment, etc.) to the media.

In addition to and/or as part of collecting media identifying and/or people data, some monitoring systems collect state information associated with one or more media presentation devices (e.g., a television, a computer, a tablet, a smart phone, etc.). For example, monitoring systems determine whether a television in a living room is in an ON state (e.g., powered on and/or presenting image and/or audio data) or in an OFF state (e.g., powered off and/or not presenting image and/or audio data). A media device in an ON state is referred to herein as being ON, and a media device in an OFF state is referred to herein as being OFF. To determine whether a media device is ON or OFF, some monitoring systems utilize audio information collected from an environment in which the media device is deployed. For example, if audio information meeting a threshold condition (e.g., a minimum volume level or a maximum automatic gain control (AGC) level) is collected from the environment, the media device is determined to be ON or likely to be ON. If the audio information does not meet the threshold condition, the media device is determined to be OFF or likely to be OFF.

Examples disclosed herein recognize challenges in such an approach, especially with respect to assigning a value to the threshold condition. For example, disclosed examples recognize that known monitoring systems that assign a fixed, predetermined value to the threshold condition have disadvantages and/or drawbacks due to the varying circumstances and/or factors involved in the collection of the audio information. Put another way, examples disclosed herein realize that accurate status detection (e.g., ON/OFF detection) relies on having a suitable value for the threshold condition and that the suitability of such a value is dependent on the specific circumstances of individual implementations. That is, while a particular value for the threshold condition may lead to accurate status detections in a first implementation (e.g., in a first environment including a first media device and a first audio sensor), that particular threshold condition value may not lead to accurate (or at least not as accurate) status detections in a second, different implementation (e.g., a second environment including a second media device and/or a second audio sensor). For example, different users have different preferences and/or tendencies when using media devices. That is, while a first user and/or first household tends to watch television at a first volume, a second user and/or second household tends to watch a television at a second volume different than the first volume.

Additionally or alternatively, different acoustic characteristics of different environments (e.g., living rooms) may cause a same audio sensor detecting a same sound to register different volumes in the different environments. Additionally or alternatively, collection of the audio signal and the resulting audio parameter values may depend on a location (e.g., a distance away from the media device being monitored) in the environment at which the audio sensor is placed. Additionally or alternatively, audio sensor performance may change (e.g., degrade, become damaged, etc.) over time, thereby causing different volume detections for a same audio detection over time. Additionally or alternatively, circumstances of deployment may change over time. For example, a makeup of a household may change, thereby changing the tendencies of viewing preferences (e.g., volume levels of television watching). Another example change of circumstances includes furniture of a room being moved or changed, thereby changing the acoustic characteristics of the room. For these and/or additional or alternative reasons, collected audio information is dependent on the current circumstances of the deployment of the corresponding audio sensor.

To avoid disadvantages and/or drawbacks of known monitoring systems that assign a fixed, predetermined value to a threshold condition despite the varying circumstances (e.g., across deployment instances and/or over time), examples disclosed herein generate dynamic, customized values for a threshold condition based on specific circumstances of specific deployments or implementations during specific time periods. As described in detail below, example methods and apparatus disclosed herein generate a collection of audio values that are known to correspond to a particular media device being ON in a particular environment. The collection of audio values known to correspond to the media device being ON is referred to herein as an ON-indicative value collection.

To generate the ON-indicative value collection, disclosed examples take advantage of a likelihood that the media device is ON when, for example, a code (e.g., a media identifying code inserted into media) is detected in the environment. Additionally or alternatively, disclosed examples take advantage of a likelihood that the media device is ON when, for example, a signature (e.g., a representation of a characteristic of the signal carrying or representing one or more aspects of the media) is detected in the environment. While examples disclosed below utilize a code detection as an indication of the media device being ON, any other suitable ON-indication can be used. When such an ON-indication is detected in the environment, examples disclosed herein capture or otherwise obtain sound level indicative audio data from the environment corresponding to a time of the ON-indication. In some examples, the sound level indicative audio data obtained from the environment is a volume level.

Alternatively, in some examples, the sound level indicative audio data obtained from the environment is an audio gain level being used by automatic gain control (AGC) functionality employed by audio processing component(s). In some examples, the AGC functionality from which the audio gain level is obtained is employed in connection with a media detector to regulate (e.g., amplify or attenuate) audio signals of varying strengths (e.g., amplitudes) to reduce fluctuation of the audio signals. As disclosed in detail below, a value of the obtained audio gain level is an indication of the sound level in the environment. For example, first audio gain level of a first value is indicative of a first sound level, while a second audio gain level of a second value greater than the first value is indicative of a second sound level quieter than the first sound level (e.g., because a greater amount of amplification is applied to the quieter audio signal by the AGC functionality). In some examples, audio gain level information is used to populate the ON-indicative value collection when access to data associated with AGC functionality is readily available, while a volume level is used to populate the ON-indicative value collection when access to the AGC data is not readily available. Additional or alternative types of audio data can be used by examples disclosed herein as ON-indicative information.

Examples disclosed herein store the obtained audio data of the ON-indicative value collection in any suitable data structure. In some examples disclosed herein, the ON-indicative value collection is implemented by a circular buffer having a B number of elements. As a circular buffer, the example ON-indicative value collection reflects a recent (e.g., a most recent twenty-four hour period, a most recent week, a most recent month, etc.) set of values. As such, the ON-indicative value collection generated and maintained by examples disclosed herein includes a plurality of audio values each corresponding to a recent indication (e.g., volume level and/or AGC level) of the media device being ON.

Examples disclosed herein utilize the ON-indicative value collection to identify a value for the threshold condition that is desirable (e.g., reflective of actual conditions and, thus, likely to produce highly accurate results) for a recent period of time (e.g., a most recent twenty-four hours, a most recent week, a most recent month, etc.) and for an actual deployment scenario (e.g., for a specific media device, for a specific audio sensor, for a specific environment having specific acoustic characteristics, etc.). Examples disclosed herein identify an entry in the ON-indicative value collection corresponding to a quietest audio level known to correspond to the media device being on. Examples disclosed herein assign the identified element of the ON-indicative value collection to the threshold condition, which is used to determine whether the media device is ON or OFF. In particular, the threshold condition is used to determine whether the current audio conditions of the monitored environment meet or exceed a minimum audio level, thereby indicating that the monitored media device(s) is ON.

In some examples, the process of identifying the element of the ON-indicative value collection corresponding to the quietest sound level and assigning the identified audio value to the threshold condition is performed periodically and/or aperiodically. Additionally or alternatively, the threshold condition assignment process may be triggered by an event such as, for example, a particular number of code detections and/or new entries in the ON-indicative value collection.

Accordingly, examples disclosed herein enable generation and use of customized, up-to-date threshold condition values in ON/OFF detection components and/or techniques. Notably, examples disclosed herein enable generation and use of the customized, up-to-date threshold condition values without requiring an entity implementing the ON/OFF components and/or techniques to customize each deployment. That is, entities implementing monitoring systems can utilize examples disclosed herein to customize ON/OFF components and/or techniques for specific, current circumstances without having to obtain knowledge of the specific circumstances and without having to incur the significant costs involved in such a task. Instead, examples disclosed herein automatically provide threshold values learned by the system based on specific circumstances.

FIG. 1 illustrates an example media exposure environment 100 including a media presentation device 102, an example meter 104 constructed in accordance with teachings of this disclosure, and an audience 106 including a first person 108 and a second person 110. In the illustrated example of FIG. 1, the media presentation device 102 is a television and the media exposure environment 100 is a room of a household (e.g., a room in a home of a panelist such as the home of a "Nielsen family") that has been statistically selected to develop television ratings data for population(s)/demographic(s) of interest. In the illustrated example of FIG. 1, one or more persons of the household have registered with an audience measurement entity (e.g., by agreeing to be a panelist) and have provided demographic information to the audience measurement entity as part of a registration process to enable association of demographics with viewing activities (e.g., media exposure). The example meter 104 of FIG. 1 can be implemented in additional and/or alternative types of environments such as, for example, a room in a non-statistically selected household, a theater, a restaurant, a tavern, a retail location, an arena, etc. In some examples, the example meter 104 of FIG. 1 is implemented, at least in part, in connection with additional and/or alternative types of media presentation devices such as, for example, a radio, a computer, a tablet (e.g., an iPad®), a cellular telephone, and/or any other communication device able to present media to one or more individuals.

In some examples, the meter 104 of FIG. 1 is implemented by software installed in consumer electronics associated with the environment 100 such as, for example, a set-top box, a BluRay disc player, and/or a video game system (e.g., an XBOX® having a Kinect® sensor). In such instances, the example meter 104 of FIG. 1 is, for example, downloaded from a network, installed at the time of manufacture, installed via a port (e.g., a universal serial bus (USB) port receiving a jump drive provided by the audience measurement company), installed from a storage disc (e.g., an optical disc such as a BluRay disc, Digital Versatile Disc (DVD) or CD (compact Disk)), and/or any other suitable manner of installation. Executing the meter 104 on equipment associated with (e.g., owned by) one or more panelists is advantageous in that costs of installation are reduced by relieving the audience measurement entity of the need to supply hardware to the monitored household. In some examples, the meter 104 is integrated with the consumer electronics (e.g., by the manufacturer prior to sale to the consumer). That is, in some examples, the consumer electronics into which the meter 104 is integrated may be repurposed (and/or data collected by the consumer electronics may be repurposed) for audience measurement. For example, the meter 104 of FIG. 1 may utilize one or more sensors of a video game system to collect, for example, image data from the environment 100.

In some examples, rather than installing the meter 104 on the consumer electronics of the panelist(s), the example meter 104 of FIG. 1 is a dedicated audience measurement unit provided by the audience measurement entity. In such examples, the meter 104 may include its own housing, hardware (e.g., processor, logic circuit, etc.), memory and software to perform the desired audience measurement functions. In some examples, the dedicated meter 104 is adapted to communicate with (e.g., via a wired and/or wireless connection), for example, information capturing devices implemented in the environment 100 such as, for example, a video game system having image capturing equipment and/or audio capturing equipment. In some examples, the communications are effected via the consumer electronics of the panelist (e.g., via a video game console). In some examples, the meter 104 includes information collection device(s), such as an image capturing device and/or audio sensors and, thus, no direct interaction (outside of monitoring outputs) with the consumer electronics owned by the panelist is involved.

The example meter 104 of FIG. 1 reports collected information (e.g., data representative of media being presented in the environment 100, data representative of the audience 106, and/or data representative of a state of the media presentation device 102) to, for example, a data collection facility 110. In the illustrated example of FIG. 1, the data collection facility 110 receives information from other panelist sites 112,114 in addition to the example media exposure environment 100. In the example of FIG. 1, the data collection facility 110 is associated with the audience measurement entity that deployed the meter 104 in the environment 100. The audience measurement entity associated with the example data collection facility 110 of FIG. 1 utilizes the information collected from the example media exposure environment 100 and/or the panelist sites 112, 114 to generate exposure information. The information from many panelist locations may be collected and analyzed to generate ratings (e.g., in real-time or non-real-time) representative of media exposure by one or more populations of interest.

Figure 2:
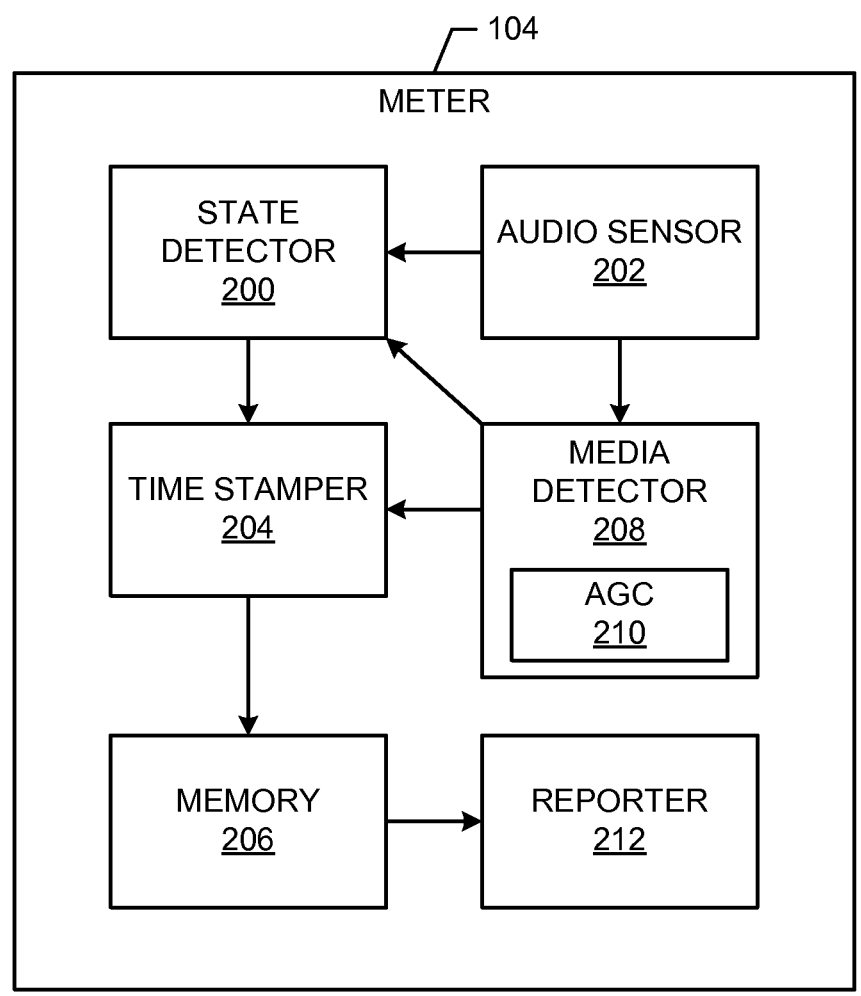
FIG. 2 is a block diagram of an example implementation of the example meter of FIG. 1.

FIG. 2 illustrates an example implementation of the meter 104 of FIG. 1. The example meter 104 of FIG. 2 includes a state detector 200 to detect a state (e.g., ON state or OFF state) of the media presentation device 102 of FIG. 1 based on audio data collected by an example audio sensor 202. In some examples, the audio sensor 202 is implemented within a housing of the meter 104 (and/or a housing of a consumer electronics component, such as a video game console, with which the meter 104 is integrated). Additionally or alternatively, the example audio sensor 202 is a physically separate component in communication with the example meter 104. As disclosed in detail below in connection with FIGS. 2-7, the example state detector 200 enables detection of a state of the media presentation device 102 via audio information collected by the example audio sensor 202.

Based on an analysis of the audio information collected by the audio sensor 202, the example state detector 200 of FIG. 2 outputs state indication representative of a current state (e.g., ON or OFF) of the media presentation device 102. For example, the state detector 200 of FIG. 2 outputs a first state indication (e.g., true) to indicate that the monitored media presentation device 102 is ON state or a second state indication (e.g., false) to indicate that the monitored media presentation device 102 is OFF. In the illustrated example of FIG. 2, the state detector 200 conveys the state indication to a time stamper 204. The example time stamper 204 of FIG. 2 includes a clock and a calendar. The example time stamper 204 associates a time period (e.g., 1:00 a.m. Central Standard Time (CST) to 1:01 a.m. CST) and date (e.g., Jan. 1, 2014) with each state indication by, for example, appending the period of time and date information to an end of the state indication. In some examples, the time stamper 204 applies a single time and date rather than a period of time.

A data package (e.g., the state indication and the time stamp) is stored in memory 206 of the example meter 104. The example memory 206 of FIG. 2 may include a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example memory 206 of FIG. 2 may also include one or more mass storage devices such as, for example, hard drive disk(s), compact disk drive(s), digital versatile disk drive(s), etc. When the example meter 104 is integrated into, for example, a video game system or a set-top box, the meter 104 may utilize memory of the video game system or the set-top box to store information such as, for example, the status identifiers generated by the example state detector 200 and time stamped by the example time stamper 204.

The example time stamper 204 of FIG. 2 also receives data from an example media detector 208 of the example meter 104 of FIG. 2. The example media detector 208 of FIG. 2 detects presentation(s) of media in the media exposure environment 100 of FIG. 1 and/or collects identification information associated with the detected presentation(s). For example, the media detector 208 of FIG. 2, which may be in wired and/or wireless communication with the media presentation device 102 (e.g., a television), a video game system deployed in the environment 100, a set-top box associated with the media presentation device 102, and/or any other component of FIG. 1, can identify a presentation time and/or a source of a presentation. The presentation time and the source identification data (e.g., channel identification data) may be utilized to identify the program by, for example, cross-referencing a program guide configured, for example, as a look up table. In such instances, the source identification data is, for example, the identity of a channel (e.g., obtained by monitoring a tuner of a set-top box or a digital selection made via a remote control signal) currently being presented on the media presentation device 102 of FIG. 1.

Additionally or alternatively, the example media detector 208 of FIG. 2 can identify the presentation by detecting codes and/or watermarks embedded with or otherwise conveyed (e.g., broadcast) with media being presented via a set-top box and/or the media presentation device 102. As used herein, a code is an identifier that is transmitted with and/or otherwise associated with media for the purpose of identifying (e.g., an audience measurement code) the media and/or a source of the media and/or for the purpose of tuning to (e.g., a packet identifier (PID) header and/or other data used to tune or select packets in a multiplexed stream of packets) the corresponding media. Codes may be carried in the audio, in the video, in metadata, in a vertical blanking interval, in a program guide, in content data, or in any other portion of the media and/or the signal carrying the media. In the illustrated example of FIG. 2, the media detector 208 extracts the code(s) from the media. In some examples, the media detector 208 may collect samples of the media and export the samples to a remote site (e.g., the data collection facility 110 of FIG. 1) for detection of the code(s).

In the illustrated example of FIG. 2, the media detector 208 provides a notification that a code was detected to the example state detector 200. Thus, when the media detector 208 of FIG. 2 determines that a code is present in the environment 100, the example state detector 200 receives the notification from the media detector 208. The notification received by the example state detector 200 indicative of a code being present in the environment 100 is referred to herein as a code-detected notification. As disclosed in detail below in connection with FIGS. 3-7, the example state detector 200 utilizes the code-detected notifications to identify a suitable value for a threshold condition used to determine the state of the media presentation device 102. As the code-detected notification is used by the example state detector 200 as an indication of the media presentation device 102 being ON, the code-detected notification is referred to as an ON-indication. Additional or alternative types of detections indicative of the media presentation device 102 being ON are referred to as ON-indications.

Additionally or alternatively, the example media detector 208 of FIG. 2 can collect a signature to identify the media. As used herein, a signature is a representation of a characteristic of the signal carrying or representing one or more aspects of the media (e.g., a frequency spectrum of an audio signal). Signatures may be thought of as fingerprints of the media. Collected signature(s) can be compared against a collection of reference signatures of known media (e.g., content and/or advertisements) to identify tuned media. In some examples, the signature(s) are generated by the media detector 208. Additionally or alternatively, the example media detector 208 of FIG. 2 collects samples of the media and exports the samples to a remote site for generation of the signature(s). While the below examples disclosed in connection with FIGS. 3-7 utilize detections of codes as ON-indications (e.g., indicators of the media presentation device 102 being ON), the example state detector 200 may utilize a signature detection as an ON-indication.

The example media detector 208 of FIG. 2 includes an AGC component 210 to implement AGC functionality. Automatic gain control (AGC) functionality regulates audio signals of varying strengths (e.g., amplitudes) to reduce fluctuation of the audio signals provided by the example audio sensor 202. For example, when a strength of the received audio signal is weak (e.g., below a particular amplitude), the AGC component 210 applies a particular audio gain level to the input audio signal to provide a stronger (e.g., greater amplitude) output signal. The particular audio gain level applied by the AGC component 210 is proportional to the weakness of the audio signal. For example, the AGC component 210 of FIG. 2 utilizes a scale or range of audio gain levels from which a suitable audio gain level is selected for application to the audio information collected by the audio sensor 202. In the illustrated example, higher audio gain levels of the scale correspond to quiet audio information being present in the environment 100, while lower audio gain levels of the scale correspond to loud audio information being present in the environment 100. For example, when first audio information having a first volume is collected by the example audio sensor 202, the AGC component 210 applies a first audio gain level to the audio information. When a second audio information having a second volume less than the first volume is collected by the example audio sensor 202, the AGC component 210 applies a second audio gain level greater than the first audio gain level to the audio information. In the illustrated example, the scale of audio gain levels is zero (0) to one hundred (100), with one-hundred (100) corresponding to a quietest sound and zero (0) corresponding to a loudest sound. As such, a point in the scale at which a current audio gain level falls is indicative of a current sound level in the environment 100.

In the illustrated example of FIG. 2, the media detector 208 provides (e.g., in response to a request) a current audio gain level associated with the AGC component 210 to the example state detector 200. Thus, the example state detector 200 of FIG. 2 receives information from the AGC component 210 indicative of a current sound level present in the environment 100. As disclosed in detail below in connection with FIGS. 3-7, the example state detector 200 utilizes the received audio gain levels to generate an ON-indicative value collection that forms a basis for assigning a value to a threshold condition of an ON/OFF detection process. Additionally, as disclosed in detail below in connection with FIGS. 3-7, the example state detector 200 utilizes the received audio gain levels to identity a current state of, for example, the media presentation device 102 via a comparison of the current audio gain level to the threshold condition.

In the example of FIG. 2, the media detector 208 conveys the media identifying information (e.g., a code) to the example time stamper 204, which time stamps the received information. In the illustrated example of FIG. 2, the time stamper 204 appends a time stamp to the received media identifying information to generate a data package including the media identifying information and a time indicative of when the media detector 208 collected the media identifying information from the environment 100.

To convey data to the example data collection facility 110, the example meter 104 of FIG. 2 includes a reporter 212. The example reporter 212 of FIG. 2 utilizes a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.) to communicate with the data collection facility 110 and/or other devices. In some examples, the reporter 212 utilizes communication capabilities (e.g., network connections) of a video game system and/or a set-top box to communicate with, for example, the data collection facility 110.

While an example manner of implementing the meter 104 of FIG. 1 is illustrated in FIG. 2, one or more of the elements, processes and/or devices illustrated in FIG. 2 may be combined, divided, re-arranged, omitted, eliminated and/or implemented in any other way. Further, the example state detector 200, the example time stamper 204, the example media detector 208, the example AGC component 210, the example reporter 212 and/or, more generally, the example meter 104 of FIG. 2 may be implemented by hardware, software, firmware and/or any combination of hardware, software and/or firmware. Thus, for example, any of the example state detector 200, the example time stamper 204, the example media detector 208, the example AGC component 210, the example reporter 212 and/or, more generally, the example meter 104 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example state detector 200, the example time stamper 204, the example media detector 208, the example AGC component 210, the example reporter 212 and/or, more generally, the example meter 104 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example meter 104 of FIG. 1 may include one or more elements, processes and/or devices in addition to, or instead of, those illustrated in FIG. 2, and/or may include more than one of any or all of the illustrated elements, processes and devices.

Figure 3:
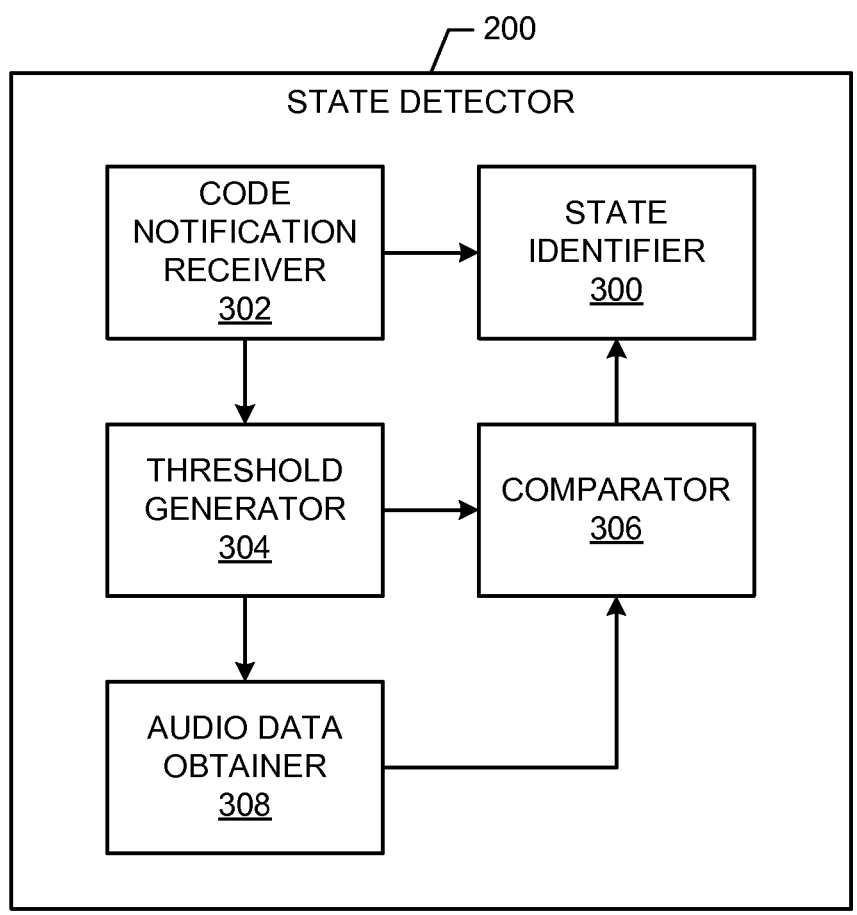
FIG. 3 is a block diagram of an example implementation of the example state detector of FIG. 2.

FIG. 3 illustrates an example implementation of the example state detector 200 of FIG. 2. The example state detector 200 of FIG. 3 includes a state identifier 300, a code notification receiver 302, a threshold generator 304, a comparator 306, and an audio data obtainer 308. The example state identifier 300 of FIG. 3 generates state indications representative of a state (e.g., ON or OFF) of, for example, the media presentation device 102 of FIG. 1. The example state identifier 300 of FIG. 3 generates the state indications based audio information collected by the example audio sensor 202 of FIG. 2. The example state identifier 300 of FIG. 3 determines that the media presentation device 102 is ON when (1) a code is detected in the environment 100 or (2) current audio data collected from the environment 100 meets a threshold condition. From a different perspective, the example state identifier 300 of FIG. 3 determines that the media presentation device 102 is OFF when (1) a code is not detected in the environment 100 and (2) the current audio data collected from the environment 100 does not meet the threshold condition. Thus, at any given time, the example state identifier 300 of FIG. 3 generates a state indication and conveys the same to the example time stamper 204 of FIG. 2 such that the detected state of the media presentation device 102 at the given time can be recorded in the example memory 206 of FIG. 2.

The example code notification receiver 302 of FIG. 3 receives the code-detected notifications generated by the example media detector 208 of FIG. 2. As described above, the code-detected notifications received by the code notification receiver 302 of FIG. 3 indicate that a code (e.g., media identifying data inserted into a media presentation generated by the example media presentation device 102 of FIG. 1) was detected in the environment 100. In the illustrated example of FIG. 3, the code notification receiver 302 provides the code-detected notifications to the state identifier 300. When the example state identifier 300 of FIG. 3 receives a code-detected notification from the example code notification receiver 302 of FIG. 3 (and/or from a different source of code-indicative information), the example state identifier 300 generates a state indication corresponding to the media presentation device 102 being ON. That is, when the code notification receiver 302 indicates that a code is present in the environment 100, the example state identifier 300 of FIG. 3 determines that the media presentation device 102 is ON regardless of whether the current audio level in the environment 100 meets the threshold condition. The example state identifier 300 of FIG. 3 does so because the presence of the code in the environment 100 is highly indicative of the media presentation device 102 being ON.

When the code notification receiver 302 indicates that a code is not present in the environment 100, the example state identifier 300 of FIG. 3 bases the ON/OFF determination on whether the audio data collected from the environment 100 meets a threshold condition, as evaluated by the example threshold generator 304, the comparator 306, and the audio data obtainer 308. That is, while a code may not be present in the environment 100, the media presentation device 102 may be ON (e.g., presenting media not embedded with a code) or may be OFF (e.g., not presented media). As described below, when no code is present in the environment 100 at a particular time, the example comparator 306 of FIG. 3 obtains a current (e.g., corresponding to the particular time at which no code is present) value of the threshold condition from the example threshold generator 304 of FIG. 3 and compares the current value of the threshold condition to current (e.g., corresponding to the particular time at which no code is present) audio data obtained from the environment 100 by the example audio data obtainer 308 of FIG. 3.

To provide the current value of the threshold condition 304, the example threshold generator 304 utilizes indications (e.g., code-detected notifications) of the media presentation device 102 being ON and audio data collected from the environment 100 at corresponding times. In the illustrated example of FIG. 3, the code notification receiver 302 of FIG. 3 provides the code-detected notifications to the example threshold generator 304 as indications that the media presentation device 102 is currently ON. In response, the example threshold generator 304 of FIG. 3 records the audio data of the environment 100 at a time corresponding to the code detection.

As disclosed in detail below in connection with FIG. 4, the example threshold generator 304 utilizes the code-detected notification and the audio data collected from the environment 100 to assign the value to the threshold condition used by the example comparator 306 to determine whether the current audio data is indicative of the media presentation device 102 being ON or OFF. The example threshold generator 304 of FIG. 3 generates a value for any suitable type of audio characteristic and/or measurement such as, for example, an audio gain level being used by the example AGC component 210 of FIG. 2.

The example threshold generator 304 of FIG. 3 provides the currently assigned value of the threshold condition to the example comparator 306 of FIG. 3. The example comparator 306 of FIG. 3 compares the current value of the threshold condition to current audio data obtained by the example audio data obtainer 308 of FIG. 3. The current audio data obtained by the example audio data obtainer 308 of FIG. 3 corresponds to the audio information currently being sensed or collected by the example audio sensor 202 of FIG. 2 from the environment 100. That is, the current audio data obtained by the example audio data obtainer 308 of FIG. 3 is indicative of current audio conditions present in the environment 100. The example audio data obtainer 308 of FIG. 3 obtains (e.g., by collecting or retrieving) and/or generates (e.g., by processing obtained data) the type of audio characteristic and/or measurement being used by the example threshold generator 304 for the threshold condition. For example, the audio data obtainer 308 of FIG. 3 obtains an audio gain level being used by the AGC component 210 of the media detector 208 of FIG. 2. The example audio data obtainer 308 of FIG. 3 may obtain any additional or alternative type of audio characteristic and/or measurement corresponding to the audio characteristic and/or measurement being used for the threshold condition.

In the illustrated example of FIG. 3, when the current audio conditions present in the environment 100 meet the threshold condition, the example comparator 306 conveys data to the state identifier 300 indicating that the audio conditions currently present in the environment 100 signify that the media presentation device 102 is likely ON. In the illustrated example of FIG. 3, when the current audio conditions present in the environment 100 do not meet the threshold condition, the example comparator 306 conveys data to the state identifier 300 indicating that the audio conditions currently present in the environment 100 signify that the media presentation device 102 is likely OFF. The example state identifier 300 of FIG. 3 receives the state-indicative data from the comparator 306 and generates a state indication according to the received information.

While an example manner of implementing the state detector 200 of FIG. 2 is illustrated in FIG. 3, one or more of the elements, processes and/or devices illustrated in FIG. 3 may be combined, divided, re-arranged, omitted, eliminated and/or implemented in any other way. Further, the example state identifier 300, the example code notification receiver 302, the example threshold generator 304, the example comparator 306, the example audio data obtainer 308 and/or, more generally, the example state detector 200 of FIG. 3 may be implemented by hardware, software, firmware and/or any combination of hardware, software and/or firmware. Thus, for example, any of the example state identifier 300, the example code notification receiver 302, the example threshold generator 304, the example comparator 306, the example audio data obtainer 308 and/or, more generally, the example state detector 200 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example state identifier 300, the example code notification receiver 302, the example threshold generator 304, the example comparator 306, the example audio data obtainer 308 and/or, more generally, the example state detector 200 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example state detector 200 of FIG. 2 may include one or more elements, processes and/or devices in addition to, or instead of, those illustrated in FIG. 3, and/or may include more than one of any or all of the illustrated elements, processes and devices.

Figure 4:
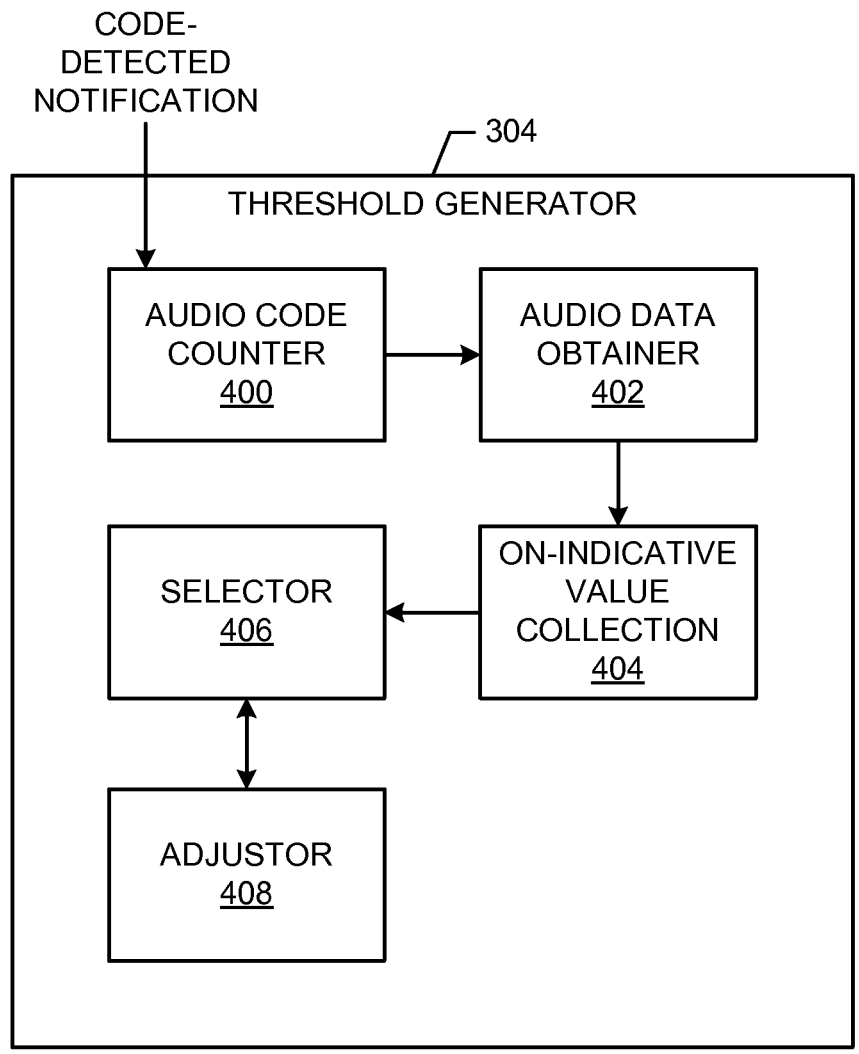
FIG. 4 is a block diagram of an example implementation of the example threshold generator of FIG. 3.

FIG. 4 is a block diagram of an example implementation of the threshold generator 304 of FIG. 3. The example threshold generator 304 of FIG. 4 utilizes the code-detected notifications described above and audio data present in the environment 100 at the times corresponding to the code-detected notifications to generate a value for the threshold condition used by the example comparator 306 of FIG. 3 to determine whether the media presentation device 102 is ON or OFF. The example threshold generator 304 of FIG. 4 utilizes any suitable type of audio characteristic and/or measurement of sound level for the value of the threshold condition. In the illustrated example of FIG. 4, for the value of the threshold condition, the threshold generator 304 utilizes the audio gain level being applied to the currently collected (e.g., by the audio sensor 202 of FIG. 2) audio information by the AGC component 210. As described above, the audio gain levels used by the AGC component 210 are indicative of a sound level in the environment 100. Alternatively, the example threshold generator 304 of FIG. 4 may utilize volume levels and/or any other suitable characteristic or measurement.

The example threshold generator 304 of FIG. 4 includes an audio code counter 400 that receives code-detected notifications from the example code notification receiver 302 of FIG. 3. As described above, the code-detected notifications indicate that a code is detected in the environment 100 and, thus, the media presentation device 102 is likely ON and outputting audio information. In the illustrated example of FIG. 4, the audio code counter 400 implements a code count that is incremented each time a code-detected notification is received. The example audio code counter 400 of FIG. 4 triggers capture of a current audio gain level (or alternative type of audio information) when the code count reaches a particular number (N). Further, when the code count reaches N, the example audio code counter 400 of FIG. 4 resets the code count. Thus, for every Nth code-detected notification received by the example threshold generator 304 of FIG. 4, the example audio code counter 400 of FIG. 4 triggers capture of the audio gain level corresponding to the time at which the Nth code-detected notification is received. In the illustrated example, N is shown to be twenty (20). However, any suitable value for N is possible. The value of N is chosen to be large enough to maximize an amount of time while not being so large as to be unrepresentative of current sound levels.

The example threshold generator 304 of FIG. 4 includes an audio data obtainer 402 to obtain the audio data used to generate the value of the threshold condition. In the illustrated example of FIG. 4, the audio data obtainer 402 obtains the audio gain level corresponding to a time at which the audio code counter 400 triggers the audio data obtainer 402 to obtain the audio data. For example, the audio data obtainer 402 of FIG. 4 may obtain an audio gain level of ninety (90) when the media presentation device 102 is outputting audio information at a first volume, and the audio data obtainer 402 of FIG. 4 may obtain an audio gain level of forty (40) when the media presentation device 102 is outputting audio information at a second volume louder than the first volume.

For example implementation(s) in which the audio data obtainer 402 utilizes the audio gain levels as sound level indications, the example audio data obtainer 308 of FIG. 3 obtains audio gain levels as current sound level indications. That is, the example audio data obtainer 308 of FIG. 3 and the example audio data obtainer 402 of FIG. 4 obtain a same type of audio characteristic and/or measurement such that the example comparator 306 of FIG. 3 receives data of the same type from the threshold generator 304 and the audio data obtainer 308 for comparison. Moreover, while the illustrated example includes the example audio data obtainer 402 and the example audio data obtainer 308, the example state detector 200 of FIG. 2 may utilize a single audio data obtainer to obtain audio data. While the example audio data obtainer 308 of FIG. 3 and the example audio data obtainer 402 of FIG. 4 obtain audio gain levels, additional or alternative types of audio characteristic(s) (e.g., amplitude, volume, etc.) indicative of a sound level being output by the media presentation device 102 may be utilized.

In the example of FIG. 4, the audio data obtainer 402 provides the obtained audio data to an on-indicative value collection 404. In the illustrated example of FIG. 4, the audio data provided to the example on-indicative collection 404 includes audio gain levels. In the illustrated example of FIG. 4, the on-indicative value collection 404 is a circular buffer having a particular number (B) of elements. As a circular buffer, after the on-indicative value collection 404 is populated with B elements, an oldest one of the elements is discarded each time a new element is received and the new element is added to the circular buffer. In the illustrated example of FIG. 4, B is chosen to be one-hundred (100). The value of B is chosen to be large enough to capture a long historical sampling of the audio gain levels without being so large as to impose a signification computational burden. As such, the example on-indicative value collection 404 of FIG. 4 includes the most recently obtained audio gain levels corresponding to the media presentation device 102 being ON (or at least likely being ON).

The example threshold generator 304 of FIG. 4 includes a selector 406 to identify one of the elements of the example on-indicative value collection 404 corresponding to a quietest sound. In the illustrated example of FIG. 4, in which the on-indicative value collection 404 includes audio gain levels, the example selector 406 selects a greatest one of the audio gain levels of the on-indicative value collection 404 because the greatest audio gain level corresponds to a quietest sound level. Accordingly, the example selector 406 of FIG. 4 selects audio data corresponds to a quietest (e.g., of the most recently obtained pieces of audio data) sound detected in the environment 100 known to correspond to the media presentation device 102 being ON or at least likely being ON. For example, assuming the example on-indicative value collection 404 of FIG. 4 includes audio gain levels of fifty (50), fifty-five (55), eight-two (82), eighty-four (84), eight-three (83), eighty (80), the example selector 406 of FIG. 4 selects eighty-four (84) as the audio data because eighty-four (84) corresponds to a quietest sound level of the recent detections associated with the media presentation device 102 being ON. In the illustrated example of FIG. 4, if no codes are detected, the example selector 406 selects a default value (e.g., 100 for an audio gain value corresponding to a quietest possible sound) that does not interfere with, for example, other ON/OFF detection processes and/or components (e.g., by determining that the media presentation device 102 is OFF when the media presentation device 102 is actually ON).

Notably, as the contents of the on-indicative value collection 404 are repeatedly updated, the selection made by the example selector 406 reflects current media consumption tendencies of those utilizing the example media presentation device 102. That is, the example selector 406 of FIG. 4 selects audio data indicative of a quietest sound level from recent information reflective of recent user behavior (e.g., volume tendencies and/or preferences).

In some examples, the value selected by the example selector 406 is used as the value for the threshold condition. In such instances, the example selector 406 of FIG. 4 provides the selected value to the example comparator 306 of FIG. 3 when prompted for the current value of the threshold condition. Alternatively, in some examples, an adjustor 408 of the example threshold generator 304 of FIG. 4 adjusts the selection made by the example selector 406 to form the value for the threshold condition. The example adjustor 408 of FIG. 4 adjusts the selected audio data to compensate for, for example, the codes not always being detectable in the environment 100. That is, because the example on-indicative value collection 404 of FIG. 4 is based on a sampling of audio data triggered by code detections, the audio data selected by the example selector 406 may correspond to a sound level not quiet enough for a suitable threshold value. To compensate for potential selections corresponding to too great of sound levels, in some examples the example adjustor 408 of FIG. 4 weights the selected audio data. In some examples, the adjuster 408 of FIG. 4 implements a 50/50 weighting of the selected audio gain level with a fixed weight value (e.g., one-hundred fifty (150)) to arrive at the final value for the threshold condition. Additional or alternative ratios and/or weight values are possible. Alternatively, to compensate for potentially low selections, the example adjustor 408 of FIG. 8 adds an offset (e.g., twenty-eight (28)) to the selected audio gain level to arrive at the final value for the threshold condition.

While an example manner of implementing the threshold generator 304 of FIG. 3 is illustrated in FIG. 4, one or more of the elements, processes and/or devices illustrated in FIG. 4 may be combined, divided, re-arranged, omitted, eliminated and/or implemented in any other way. Further, the example audio code counter 400, the example audio data obtainer 402, the example selector 406, the example adjustor 408 and/or, more generally, the example threshold generator 304 of FIG. 4 may be implemented by hardware, software, firmware and/or any combination of hardware, software and/or firmware. Thus, for example, any of the example audio code counter 400, the example audio data obtainer 402, the example selector 406, the example adjustor 408 and/or, more generally, the example threshold generator 304 of FIG. 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audio code counter 400, the example audio data obtainer 402, the example selector 406, the example adjustor 408 and/or, more generally, the example threshold generator 304 of FIG. 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example threshold generator 304 of FIG. 3 may include one or more elements, processes and/or devices in addition to, or instead of, those illustrated in FIG. 4, and/or may include more than one of any or all of the illustrated elements, processes and devices.

Figure 5:
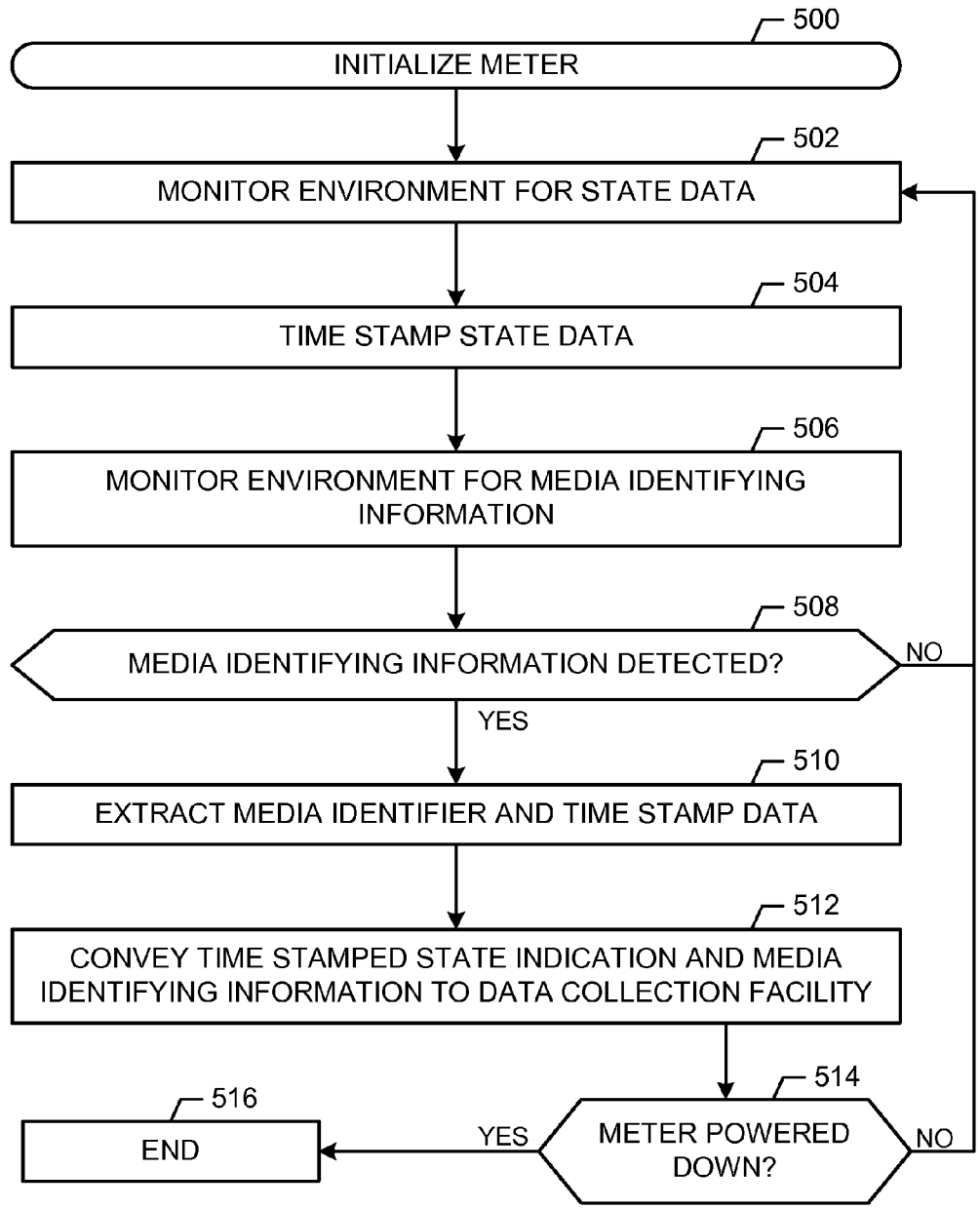
FIG. 5 is a flowchart representative of example machine readable instructions that may be executed to implement the example meter of FIGS. 1 and/or 2.
Figure 6:
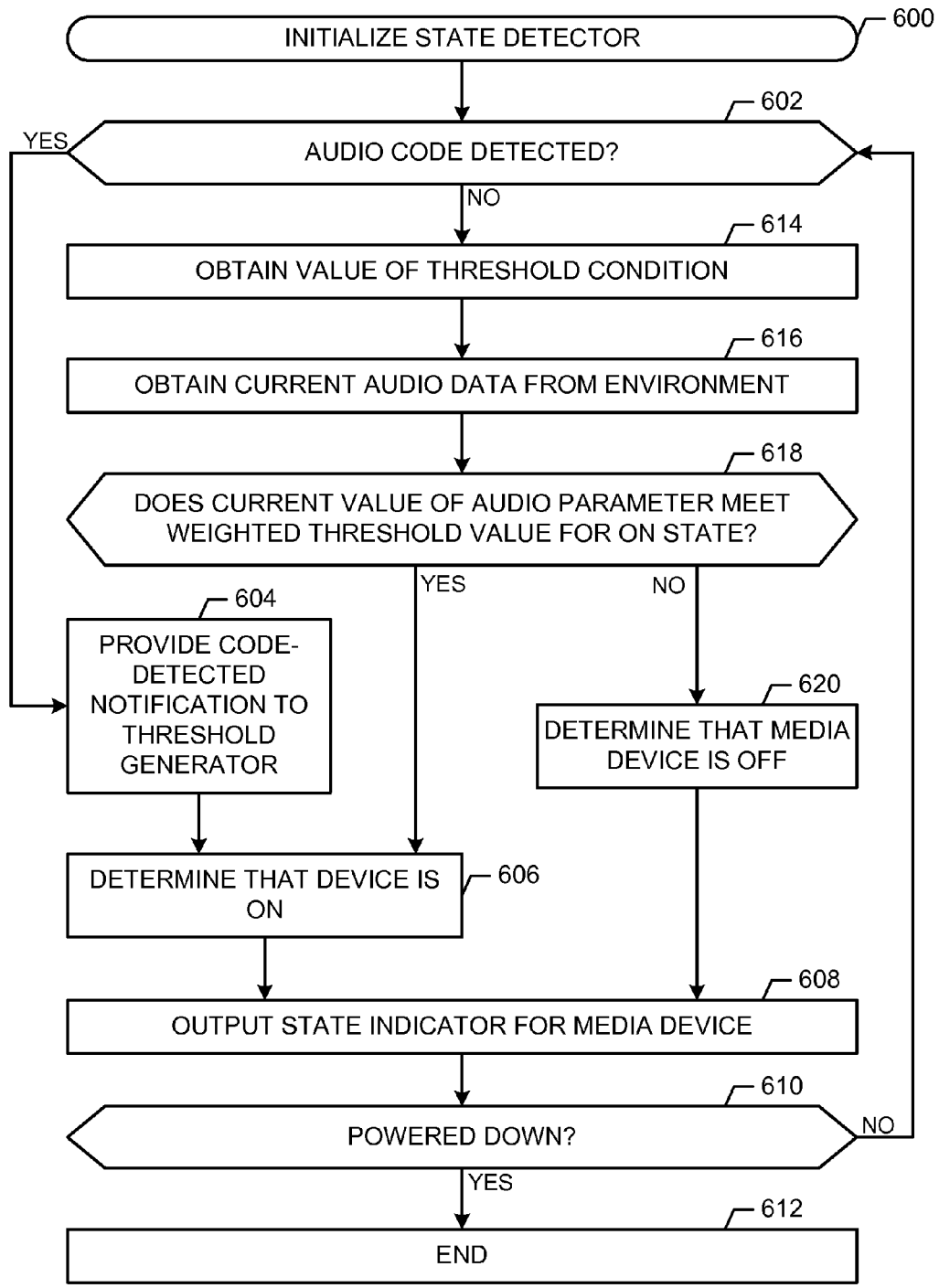
FIG. 6 is a flowchart representative of example machine readable instructions that may be executed to implement the example state detector of FIGS. 2 and/or 3.
Figure 7:
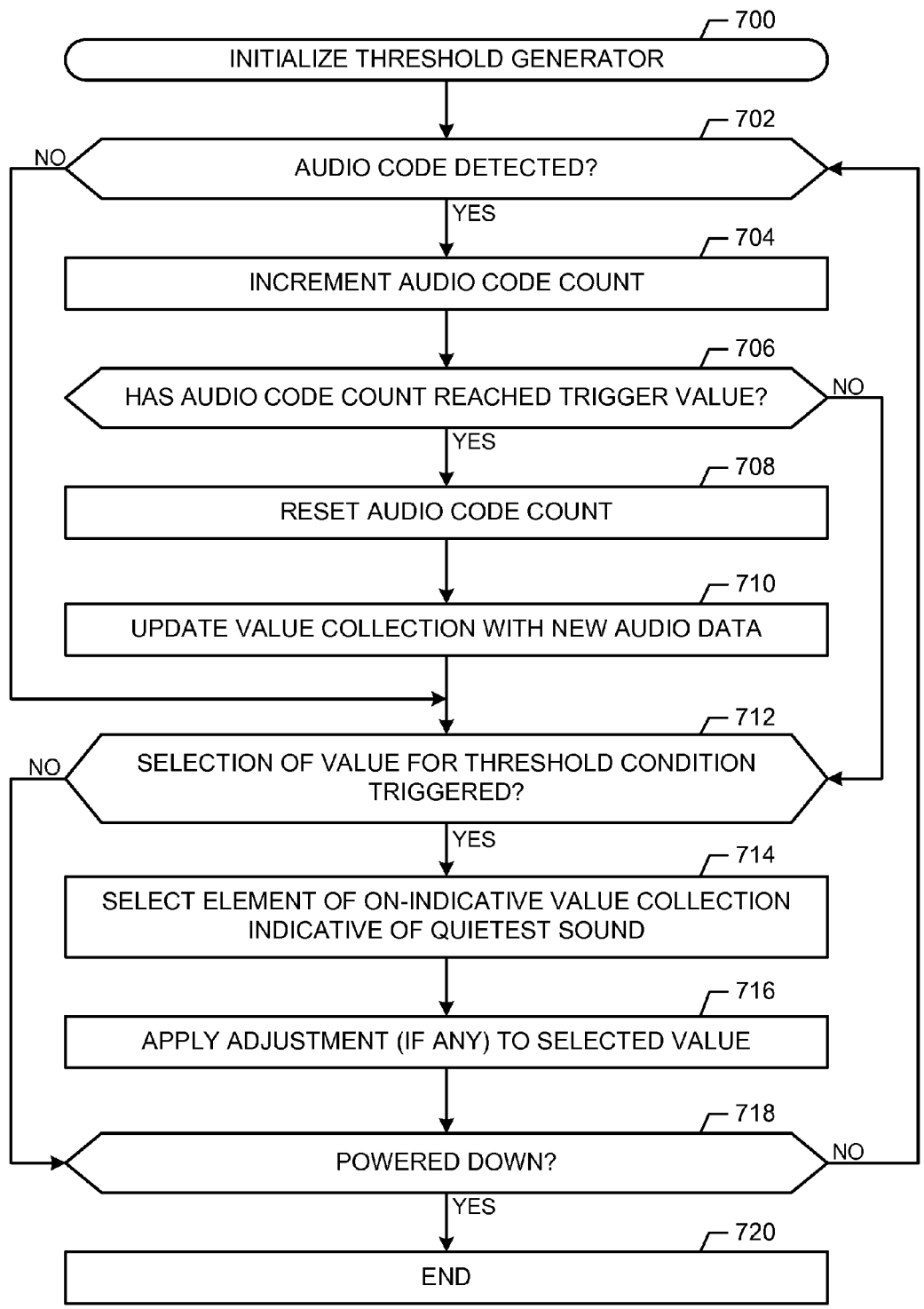
FIG. 7 is a flowchart representative of example machine readable instructions that may be executed to implement the example threshold generator of FIGS. 3 and/or 4.

A flowchart representative of example machine readable instructions for implementing the example meter 104 of FIGS. 1 and/or 2 is shown in FIG. 5. A flowchart representative of example machine readable instructions for implementing the example state detector 200 of FIGS. 2 and/or 3 is shown in FIG. 6. A flowchart representative of example machine readable instructions for implementing the example threshold generator 304 of FIGS. 3 and/or 4 is shown in FIG. 7. In these examples, the machine readable instructions comprise programs for execution by a processor such as the processor 812 shown in the example consumer electronics device 800 discussed below in connection with FIG. 8. The programs may be embodied in software stored on a tangible computer readable storage medium such as a CD-ROM, a floppy disk, a hard drive, a digital versatile disk (DVD), a Blu-ray disk, or a memory associated with the processor 812, but the entire programs and/or parts thereof could alternatively be executed by a device other than the processor 812 and/or embodied in firmware or dedicated hardware. Further, although the example programs are described with reference to the flowcharts illustrated in FIGS. 5, 6 and/or 7, many other methods of implementing the example meter 104, the example state detector 200, and/or the example threshold generator 304 may alternatively be used. For example, the order of execution of the blocks may be changed, and/or some of the blocks described may be changed, eliminated, or combined.

As mentioned above, the example processes of FIGS. 5, 6 and/or 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5, 6 and/or 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example of FIG. 5 begins with an initialization of the example meter 104 (block 500). In the illustrated example of FIG. 5, the meter 104 is initialized in response to, for example, the media presentation device 102 being deployed in the environment 100 and/or activation of the meter 104. The initialization of the meter 104 includes, for example, activating the audio sensor 202 to begin providing information to the example state detector 200 and/or the example media detector 208.

The example state detector 200 receives information from the audio sensor 202 to determine a state of the media presentation device 102 of FIG. 1 (block 502). An example implementation of block 502 is disclosed below in connection with FIG. 6. In the illustrated example of FIG. 5, the state detector 200 determines whether the media presentation device 102 is ON or OFF and generates a state indication in accordance with the determination. The example state detector 200 provides the state indication (e.g., ON or OFF) to the example time stamper 204, which time stamps the state indication (block 504).

In the example of FIG. 5, the media detector 208 monitors the environment 100 for media being presented via, for example, the media presentation device 102 (block 506). For example, the media detector 208 of FIG. 2 detects media identifying information, such as a code, in audio information collected via the audio sensor 202 and/or any other suitable source of media identifying information. In the example of FIG. 5, if media identifying information is detected in the environment 100 (block 508), the media detector 208 identifies and/or extracts, for example, a media identifier indicative of the particular media being presented by the media presentation device 102 (block 510). In the example of FIG. 5, the information generated and/or extracted by the media detector 208 is conveyed to the time stamper 204, which time stamps the media identifying information (block 510).

In the illustrated example of FIG. 5, reporter 212 conveys the time stamped state indication and the time stamped media identifying information to the data collection facility 110 of FIG. 1 (block 512). If the meter 104 is powered down (block 514), the example of FIG. 5 ends (block 516). Otherwise, control returns to block 502.

FIG. 6 begins with an initialization of the example state detector 200 of FIGS. 2 and/or 3 (block 600). In the illustrated example of FIG. 6, the initialization of the state detector 200 corresponds to the initialization of the meter 104. As described above, the example state detector 200 determines whether the media presentation device 102 of FIG. 1 is ON or OFF based on audio data collected by the example audio sensor 202 of FIG. 2. In the illustrated example of FIG. 6, the code notification receiver 302 receives code-detected notifications from, for example, the media detector 308 of FIG. 3. If the code notification receiver 302 receives a code (or any other type of indication that the media presentation device 102 is ON), thereby indicating that the media presentation device 102 is currently ON (block 602), the example code notification receiver 302 provides the code-detected notification to the example threshold generator 304 (block 604). As such, the example media detector 208 informs the example threshold generator 304 of times at which the media presentation device 102 is ON or at least likely ON. Further, as the detection of the code in environment 100 is a strong indication that the media presentation device 102 is ON, when the code notification receiver 302 receives a code-detected notification (block 602), the example state identifier 300 determines that the media presentation device 102 is ON and generates a state indication of the media presentation device 102 being ON (block 606). The example state identifier 300 outputs the generated state indication (block 608). If the state identifier 300 and/or the meter 104 is powered down) (block 610), the example of FIG. 6 ends (block 612). Otherwise control returns to block 602.

When no audio code is detected (block 602), the example state identifier 300 utilizes a comparison of the threshold condition and the current audio data in the environment 100 to determine whether the media presentation device 102 is ON or OFF. In the example of FIG. 6, the threshold generator 304 provides the current value of the threshold condition to the example comparator 306 (block 614). Further, the example audio data obtainer 308 obtains the current audio data from the environment 100 and provides the audio data to the comparator 306 (block 616). In the illustrated example of FIG. 6, the value of the threshold condition provided by the threshold generator 304 is an audio gain level and the audio data provided by the example audio data obtainer 308 is an audio gain level. As described above, the audio gain level of the threshold condition is an audio gain level indicative of a quietest sound level of a recently collected collection of sound level indication information known to corresponding to the media presentation device 102 being ON.

Further, as described above, the higher the audio gain level is, the quieter the corresponding sound level. As such, in the example of FIG. 6, the comparator 306 determines whether the current audio data from the environment 100 meets the threshold condition by determining whether the current audio gain level is less than the threshold audio gain level (block 618). If the audio gain level provided by the example audio data obtainer 308 is less than or equal to the audio gain level provided by the threshold generator 304 (block 618), the example comparator 306 outputs data (e.g., to the state identifier 300) indicative of the media presentation device 102 being ON. If the audio gain level provided by the example audio data obtainer 308 is greater than the audio gain level provided by the threshold generator 304 (block 618), the example comparator 306 outputs data (e.g., to the state identifier 300) indicative of the media presentation device 102 being OFF. As such, when the audio gain level provided by the example audio data obtainer 308 is less than or equal to the audio gain level provided by the threshold generator 304 (block 618), the example state identifier 300 determines that the media presentation device 102 is ON (block 606). When the audio gain level provided by the example audio data obtainer 308 is greater than the audio gain level provided by the threshold generator 304 (block 618), the example state identifier 300 determines that the media presentation device 102 is OFF (block 620). The example resulting state indicator is output to, for example, the data collection facility 110 (block 608). Control then returns to block 602 or the example of FIG. 6 ends (block 612).

FIG. 7 begins with an initialization of the example threshold generator 304 of FIGS. 3 and/or 4 (block 700). The example of FIG. 6 begins at block 600 with an initialization of the example state detector 200. In the illustrated example of FIG. 7, the initialization of the threshold generator 304 corresponds to the initialization of the meter 104. As described above, the audio code counter 400 receives indications that a code is detected in the environment 100 and, thus, that the media presentation device 102 is ON or at least likely ON. For example, the audio code counter 400 receives a code-detected indication from the example code notification receiver 302 of FIG. 3. When the audio code counter 400 determines that an audio code is detected in the environment 100 (block 702), the code count maintained by the audio code counter 400 is incremented (block 704). In the example of FIG. 7, the code count is maintained such that every Nth code-detected notification results in addition of corresponding audio data to the example ON-indicative value collection 404. If the audio code counter 400 determines that the code count has reached the trigger amount (e.g., the Nth detection has been received) (block 706), the example audio code counter 400 resets the code count (block 708) and the audio data obtainer 402 obtains audio data from the environment 100 (block 710).

In the example of FIG. 7, the audio data obtained by the audio data obtainer 402 is an audio gain level currently (e.g., at a time of the code detection) being used by the AGC component 210 of FIG. 2. However, additional or alternative types of audio data can be utilized as an indication of a sound level in the environment 100. The ON-indicative value collection 404 is updated with the new audio data (block 710). In the example of FIG. 7, the ON-indicative value collection 404 is implemented via circular buffer. As such, updating the ON-indicative value collection 404 includes discarded an oldest element of the ON-indicative value collection 404 and adding the newly obtained audio data to the ON-indicative value collection 404. Thus, the ON-indicative value collection 404 includes mostly recently obtained audio data known to correspond to the media presentation device 102 being ON.

In the example of FIG. 7, when no audio code is detected at block 702 or the code count has not reached the trigger value or the ON-indicative value collection 404 has been updated at block 710, the selector 406 determines whether a selection for the value of the threshold condition is scheduled (e.g., according to a schedule), requested, and/or otherwise triggered (block 712). For example, the code notification receiver 302 of FIG. 3 and/or the comparator 306 of FIG. 3 may request a value of the threshold condition from the threshold generator 304. Additionally or alternatively, the threshold generator 304 may be configured to periodically calculate a value for the threshold condition. If the selection of the value of the threshold condition is triggered (block 712), the selector 406 selects an element of the ON-indicative value collection 404 corresponding to a quietest sound level. In the example of FIG. 7, in which the elements of the ON-indicative value collection 404 are audio gain levels, the selector 406 selects a greatest one of the audio gain levels in the ON-indicative value collection 404 as the value for the threshold condition (block 714).

In the example of FIG. 7, the adjustor 408 adjusts the selected value if the threshold generator 304 is set or configured to, for example, weight or offset the selected value to accommodate to false positives and/or other inaccurate detections. In some examples, the adjustor 408 applies a 50/50 weighting to the selected audio gain level and a predetermined number such as, for example, one-hundred fifty (150). Alternatively, the adjustor 408 may apply an offset (e.g., twenty-eight) to the selected audio gain level. If such the adjustor 408 is set to apply such an adjustment, the selected value for the threshold condition is adjusted accordingly before being provided to, for example, the comparator 306 (block 716). In some examples, the adjuster 408 does not adjust the value selected by the selector 406.

If the example threshold generator 304 is, for example, powered down (block 718), the example of FIG. 7 ends (block 720). Otherwise, control returns to block 702.

Figure 8:
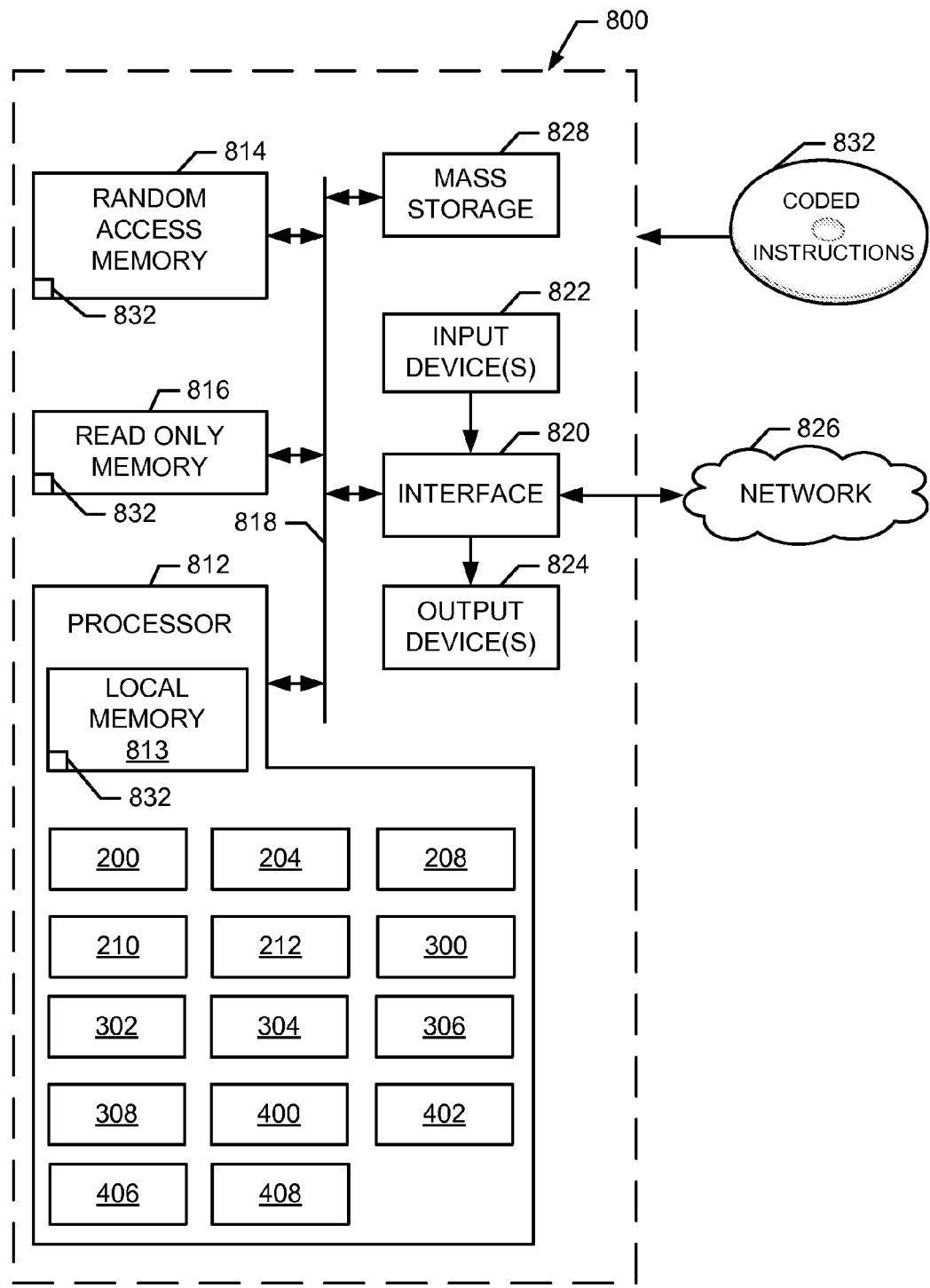
FIG. 8 is a block diagram of an example consumer electronics device implementing the example meter of FIGS. 1 and/or 2 by executing the example machine readable instructions of FIG. 5, implemented the example state detector of FIGS. 2 and/or 3 by executing the example machine readable instructions of FIG. 6, and/or implementing the example threshold generator of FIGS. 3 and/or 4 by executing the example machine readable instructions of FIG. 7.

FIG. 8 is a block diagram of an example consumer electronics device 800 that has been repurposed to execute the instructions of FIG. 5 to implement the example meter 104 of FIGS. 1 and/or 2, repurposed to execute the instructions of FIG. 6 to implement the example state detector 200 of FIGS. 2 and/or 3, and/or repurposed to execute the instructions of FIG. 6 to implement the example threshold generator 304 of FIGS. 3 and/or 4. The consumer electronics device 800 can be, for example, a server, a personal computer, a mobile device (e.g., a cell phone, a smart phone, a tablet such as an iPad®, a personal digital assistant (PDA), an Internet appliance, a DVD player, a CD player, a digital video recorder, a Blu-ray player, a gaming console, a personal video recorder, a set top box, or any other type of computing device.

The consumer electronics device 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example of FIG. 8, the state detector 200, the time stamper 204, the media detector 208, the AGC component 210, the example reporter 212, the state identifier 300, the code notification receiver 302, the threshold generator 304, the comparator 306, the audio data obtainer 308, the audio code counter 400, the audio data obtainer 402, the selector 406 and/or the adjuster 408 is/are implemented via the example processor 812.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The consumer electronics device 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touch screen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touch screen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The consumer electronics device 800 of the illustrated example also includes one or more mass storage devices 828 for storing software and/or data. In some examples, the example ON-indicative value collection 404 of FIG. 4 is implemented via the example one more mass storage devices 828 of FIG. 8. Examples of such mass storage devices 828 include floppy disk drives, hard drive disks, compact disk drives, Blu-ray disk drives, RAID systems, and digital versatile disk (DVD) drives.

Coded instructions 832 of FIGS. 5 and/or 6 may be stored in the mass storage device 828, in the volatile memory 814, in the non-volatile memory 816, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a collection of audio data elements each representative of a sound level present in an environment at a time of an ON-indication, an oldest one of the audio data elements to be replaced in response to detection of an ON-indication in the environment; and
a selector, implemented via a logic circuit, to select, for a value of a threshold condition of a state detection analysis, one of the audio data elements corresponding to a quietest sound level.

2. An apparatus as defined in claim 1, further comprising acounter to:
increment a count when an ON-indication is detected in the environment; and
trigger replacement of the oldest one of the audio data elements in response to the count reaching a particular number.

3. An apparatus as defined in claim 1, the audio data elements representing respective audio gain levels, the selector to select the one of the audio data elements corresponding to the quietest sound level by selecting a greatest one of audio gain levels.

4. An apparatus as defined in claim 1, further comprising an adjustor to weight the value selected for the threshold condition according to a fixed weighting ratio.

5. An apparatus as defined in claim 1, further comprising an audio data obtainer to populate the collection with the audio data elements, the audio data obtainer to obtain audio information corresponding to the audio data element is in response to the detection of the ON-indication.

6. An apparatus as defined in claim 1, the detection of the ON-indication comprising detection of media identifying information in the environment.

7. An apparatus as defined in claim 1, the audio data elements including audio gain levels associated with automatic gain control functionality.

8. A method, comprising:
in response to an ON-indication being detected in an environment including a media presentation device, updating a collection of audio data elements with an audio data element corresponding to a time of the detection of the ON-indication;
identifying which one of the audio data elements of the collection corresponds to a quietest sound level; and
selecting the identified one of the audio elements as a current value of a threshold condition used in a state detection analysis of the media presentation device.

9. A method as defined in claim 8, wherein updating the collection of audio data elements comprises discarding an oldest one of the audio data elements and adding the audio data element corresponding to the time of the detection of the ON-indication.

10. A method as defined in claim 8, further comprising, in response to the ON-indication being detected, incrementing a count and determining whether the count has reached a trigger value.

11. A method as defined in claim 10, further comprising, when the count has reached the trigger value, triggering the identifying of which one of the audio elements of the collection corresponds to the quietest sound level.

12. A method as defined in claim 8, further comprising adjusting the identified one of the audio elements according to a weighting ratio or an offset.

13. A method as defined in claim 8, wherein the audio data elements of the collection are audio gain levels, and the identifying of which one of the audio data elements of the collection corresponds to the quietest sound level comprises identifying a greatest one of the audio gain levels.

14. A method as defined in claim 13, wherein the audio gain levels are obtained from an automatic gain control component utilized by a media detector.

15. A method as defined in claim 8, further comprising providing the identified one of the audio data element to a comparator used in the state detection analysis.

16. A tangible computer readable storage medium comprising instructions that, when executed, cause a machine to at least:
    in response to an ON-indication being detected in an environment including a media presentation device, update a collection of audio data elements with an audio data element corresponding to a time of the detection of the ON-indication;
    identify which one of the audio data elements of the collection corresponds to a quietest sound level; and
    select the identified one of the audio elements as a current value of a threshold condition used in a state detection analysis of the media presentation device.

17. A storage medium as defined in claim 16, wherein the instructions, when executed, cause the machine device to update the collection of audio data elements by discarding an oldest one of the audio data elements and adding the audio data element corresponding to the time of the detection of the ON-indication.

18. A storage medium as defined in claim 16, wherein the instructions, when executed, cause the machine device to, in response to the ON-indication being detected, increment a count and determining whether the count has reached a trigger value.

19. A storage medium as defined in claim 18, wherein the instructions, when executed, cause the machine to, when the count has reached the trigger value, trigger the identifying of which one of the audio elements of the collection corresponds to the quietest sound level.

20. A storage medium as defined in claim 16, wherein the instructions, when executed, cause the machine to adjust the identified one of the audio elements according to a weighting ratio or an offset.

21. A storage medium as defined in claim 16, wherein the audio data elements of the collection are audio gain levels, and the instructions, when executed, cause the machine to identify of which one of the audio data elements of the collection corresponds to the quietest sound level by identifying a greatest one of the audio gain levels.

22. A storage medium as defined in claim 16, wherein the instructions, when executed cause the machine to provide the identified one of the audio data element to a comparator used in the state detection analysis.

* * * * *